UNITED STATES PATENT OFFICE.

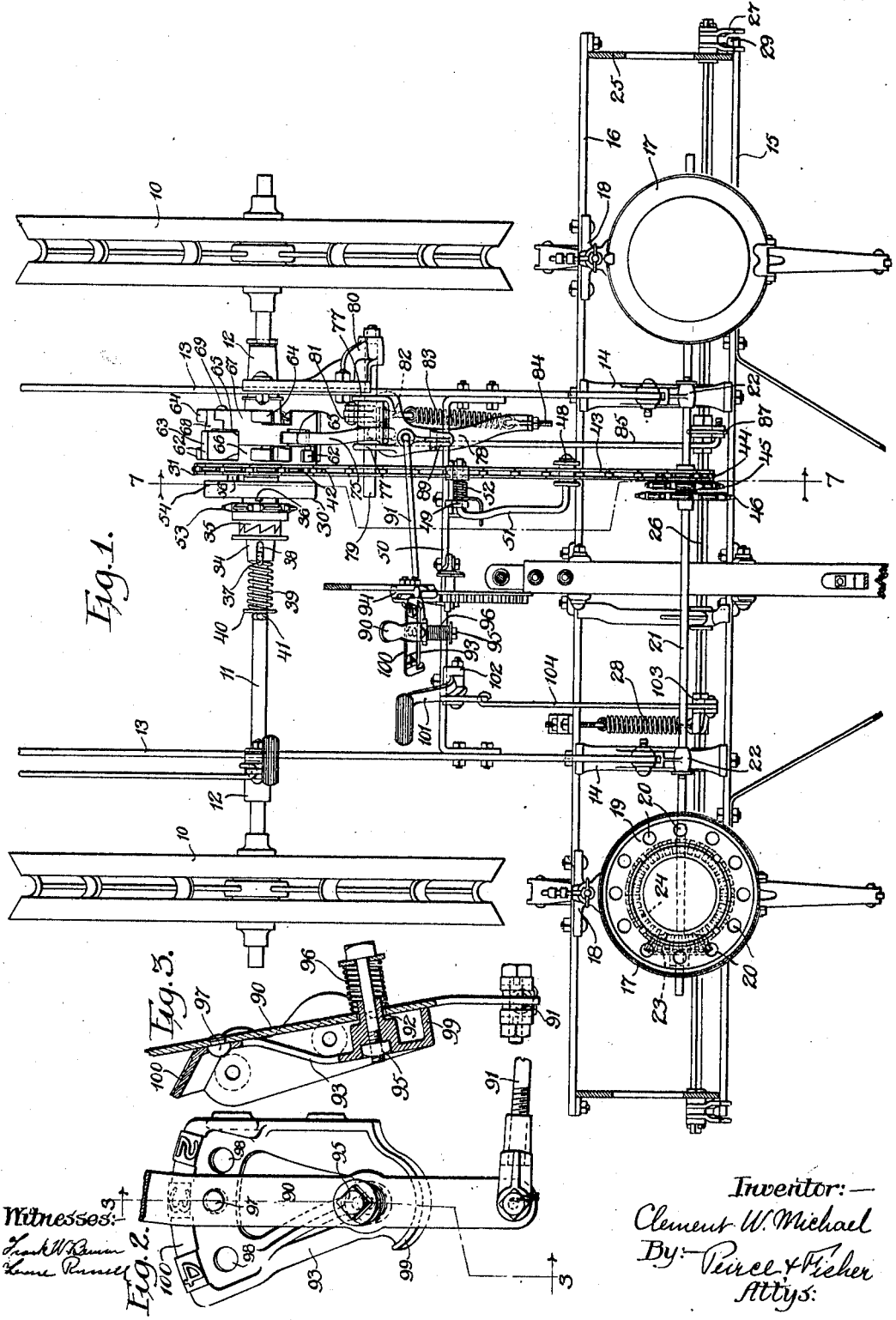

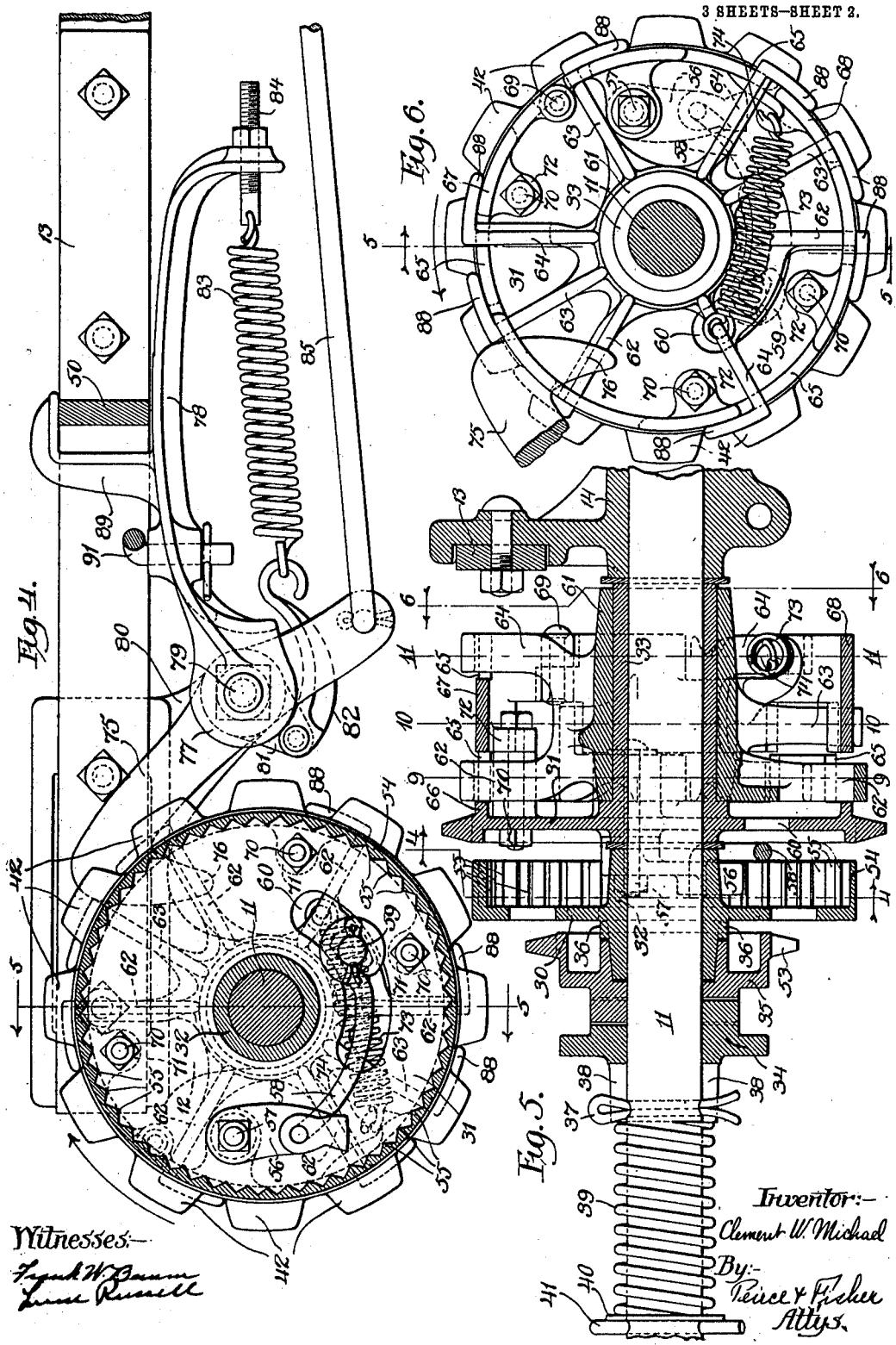

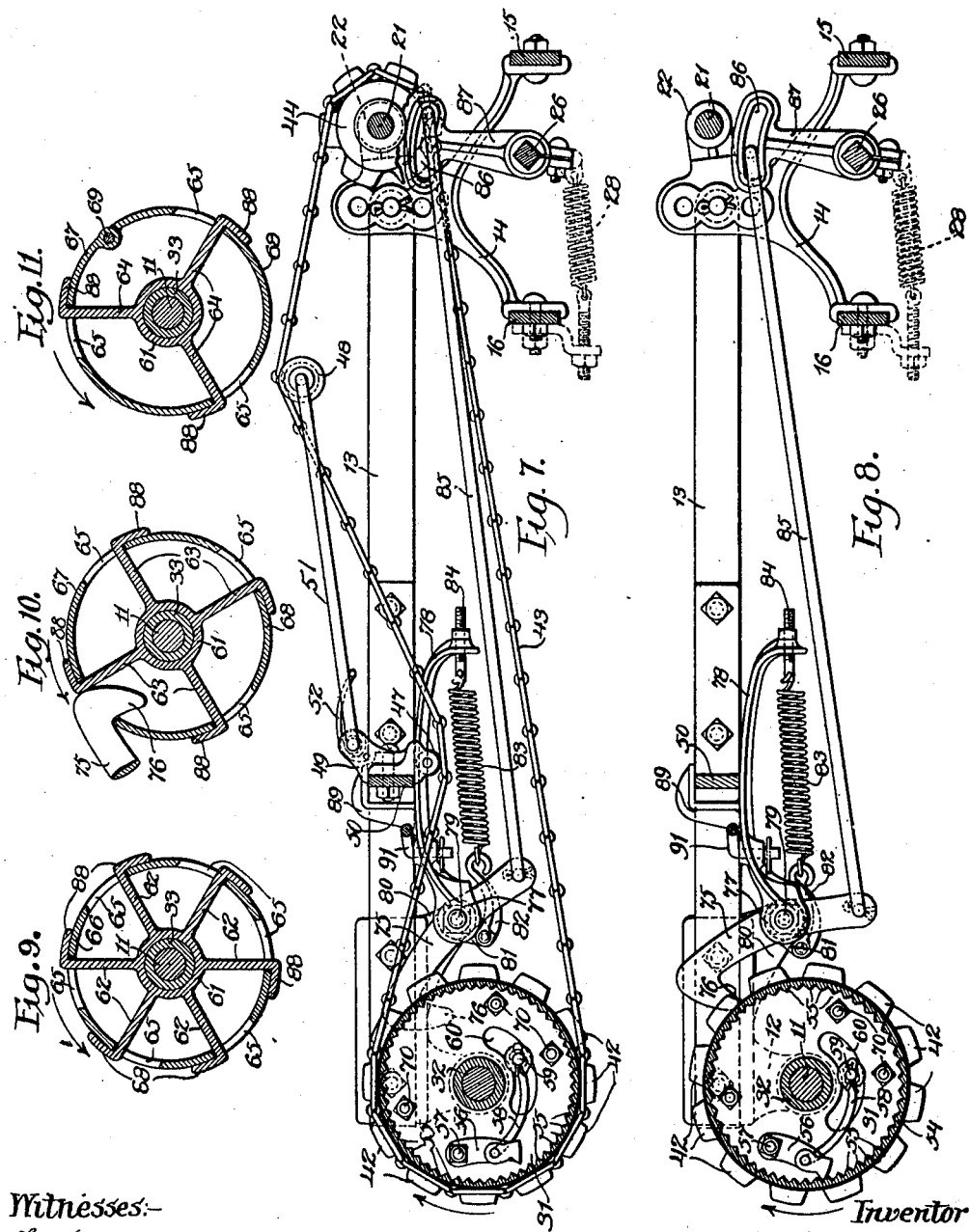

CLEMENT W. MICHAEL, OF RACINE, WISCONSIN, ASSIGNOR TO J. I. CASE PLOW WORKS, OF RACINE, WISCONSIN, A CORPORATION.

CORN-PLANTER.

1,003,936.      Specification of Letters Patent.      Patented Sept. 19, 1911.

Application filed April 29, 1909. Serial No. 492,975.

*To all whom it may concern:*

Be it known that I, CLEMENT W. MICHAEL, a citizen of the United States, and a resident of Racine, county of Racine, and State of Wisconsin, have invented certain new and useful Improvements in Corn-Planters, of which the following is a specification.

The invention relates to corn planters of that type having an intermittently operating or start-and-stop clutch which is driven from the wheel axle and controlled by the check-row devices and by which the seed plates are intermittently advanced to deposit a definite number of kernels at each hill.

The invention primarily seeks to improve the seed plate operating mechanism and the intermittently acting, automatic clutch so that the speed and wear of the parts thereof is reduced and so that the wearing parts remain idle for a considerable portion of the forward travel of the machine.

Corn planters of the type to which the invention relates usually comprise a main frame provided with supporting wheels and a transverse wheel axle whereon the main frame is hung, together with a front frame hinged to the main frame and carrying the furrow openers, seed hoppers and check-row devices. A drill shaft on the front frame is geared to the rotatable seed plates in the hoppers and is driven from the wheel axle through the medium of the automatically disengaging, check-row controlled clutch to thereby intermittently advance the seed plates at each operation to pass a predetermined number of the cells of the plate over the discharge openings of the hoppers and thus deliver a definite number of seed to the boots below the hoppers. Valves in the boots are shifted to deliver the seed thus accumulated by the check-row devices as the latter are tripped by the knots or, tappets of a check-row wire stretched across the field. The check-row devices are mounted on the front frame adjacent the hoppers and the delivery chutes or boots thereof, in order that the hills planted by the machine as it travels in opposite directions across the field shall be in line or in proper "check" and these check-row devices usually comprise forks mounted upon or connected to a rock shaft or like part that is carried on the front frame adjacent the drill shaft. The check-row rock shaft is also provided with means for initiating the operation of the start-and-stop action of the clutch mounted upon the adjacent drill shaft. The members of the clutch are automatically disengaged after they have rotated the drill shaft and seed plates through a predetermined movement to discharge the desired number of seed from the hoppers. Corn planters are also preferably provided with means whereby the throw of the seed plates can be changed to vary the number of seed deposited in each hill without stopping the machine or without changing the seed plates. This is effected by providing means for varying the throw of the clutch or by providing variable gearing of some sort between the clutch and the seed plates and is usually so arranged that either two, three or four kernels can be planted in each hill.

The automatically disengaging, start-and-stop action clutch is thrown into and out of operation every time the machine travels forward a distance equal to that between cross rows which is usually about three feet six inches. This constant intermittent starting and stopping of the clutch mechanism necessarily subjects it to a great deal of wear and it is therefore, particularly when complicated with mechanism for varying the throw of the seed plates, a constant source of trouble in the operation of the planter. Furthermore, the drill shaft and the intermittently acting, check-row controlled clutch mounted thereon is subject to vertical, lateral and oscillating movements and wearing strains and parts of the clutch are necessarily in constant operation. Again, the drill shaft is usually small and fast running and, in consequence, the clutch and bearings therefor are comparatively small and fast running and are not well adapted to stand the strains to which they are subjected. In accordance with the present invention, the intermittently acting, check-row controlled clutch is mounted upon the wheel axle which does not partake of the movements of the frame as the furrow openers rise and fall in passing over the ground and which is large and slow running. The parts of the clutch and its bearings can thus be made larger and will operate at a lower speed, so that the wear is greatly reduced. The wear of the parts is further reduced since the connecting gearing between the wheel axle and the drill shaft, instead of being constantly in action, is idle for a considerable portion of the forward travel of the machine. Furthermore, simple means, which will not readily get out of order, can be employed in connection with the large and slow running clutch to vary its throw and thereby vary the throw of the drill shaft and seed plates to change the number of seed planted at each hill without stopping the machine. Another advantage incident to the arrangement of the intermittently acting automatic clutch is that the series of sprocket wheels for the drive chain, which are usually mounted on the wheel axle and employed to vary the operation of the seed plates in drill planting, can be located upon the drill shaft between the clutch and the seed plates and can be employed in connection with the check-row controlled clutch to plant two and three or three and four kernels in alternate hills.

The preferred embodiment of the invention is hereinafter described and illustrated in the accompanying drawings.

In the drawings, Figure 1 is a plan view of the improved machine; Fig. 2 is a view in elevation of the adjusting lever for the clutch mechanism; Fig. 3 is a section on the line 3—3 of Fig. 2; Fig. 4 is a detail view of the controlling clutch mechanism with parts shown in section on the line 4—4 of Fig. 5; Fig. 5 is a detail view of the clutch mechanism with parts shown in section on the line 5—5 of Figs. 4 and 6; Fig. 6 is a detail view of the clutch mechanism with parts shown in section on the line 6—6 of Fig. 5; Fig. 7 is a view in elevation with parts shown in section on the line 7—7 of Fig. 1; Fig. 8 is a similar view with the parts shown in changed position; Figs. 9, 10 and 11 are detail sections of the clutch mechanism on the lines 9—9, 10—10 and 11—11 respectively of Fig. 5.

The machine is carried upon supporting and covering wheels 10 that are fixed to the ends of a wheel axle 11. The wheel axle is journaled in boxes 12 fixed to the side-bars 13 of the main frame of the planter. At their forward ends, the side-bars 13 are pivoted to the brackets 14 which extend between and are fixed to the front and rear bars 15 and 16 of the front runner frame. The seed cans or hoppers 17 are mounted upon suitable supports 18 on the front runner frame and are arranged as usual in front of the supporting and covering wheels 10. Each seed can is provided in its bottom with a rotatable seed measuring plate 19 having cells 20 by which the seeds are delivered, one at a time, to the boot. A drill shaft 21 is journaled in bearings 22 on the brackets 14 and carries a beveled gear 23 at each end for driving the seed plate in the adjacent hopper through the medium of a beveled gear 24 that is suitably connected to the seed plate. The end bars 15 and 16 of the front runner frame are connected by cross pieces 25 and a check row rock shaft 26 is journaled at its ends in these cross pieces. This shaft is provided with the usual forks 27 on its ends for engagement with the knots of the check row wire. A spring 28 extending between the rock shaft and the rear bar 16 of the runner frame, normally holds the rock shaft in position with the forks against suitable stops 29 at the ends of the front bar 15 of the runner frame. This shaft, as usual, controls the discharge valves in the boots of the planter which deposit the seed accumulated by the seed-plates at the hills. The parts thus far described may be of any usual or suitable construction.

In planters heretofore employed as stated, the start-and-stop action clutch mechanism is usually mounted upon the drill shaft 21. In the present invention, the clutch mechanism is mounted upon the wheel axle 11 and as the wheel axle is larger and rotates at a considerably slower speed than the drill shaft 21 the wear upon the clutch and its liability to become disarranged are considerably reduced. The intermittently operating clutch comprises two disk shaped members 30 and 31 (see Fig. 5) that are respectively provided with long sleeve like hubs 32 and 33 through which the wheel axle 11 extends. These clutch members are respectively "tight" and "loose"; that is to say, when the machine is in operation, the clutch member 30 is fixed to and rotates with the wheel axle whereas the clutch member 31 is normally stationary and only rotates when coupled to the clutch member 30. The "tight" clutch member is connected to the shaft preferably by means of two sleeves 34 and 35 having interlocking teeth. The hub 32 of the clutch member 30 is provided with projections 36 (see Figs. 1 and 5) which engage notches in the hub portion of the sleeve 35. The sleeve 34 is locked to the wheel axle by a key 37 extending through the axle and engaging notches 38 in the hub of the sleeve. A spring 39 coiled about the shaft extends between the hub of the sleeve 34 and a washer 40 that is held in place by a key 41 extending through the axle. By this means, the "tight" clutch member 30 is connected to the axle to continuously rotate therewith when the machine is in operation. When the machine is out of operation, the sleeve 34 is shifted by any suitable means (not shown) against the tension of the spring 39 and out of engagement with the sleeve 35.

The "loose" clutch member 31 is provided with a series of sprocket teeth 42 and a chain 43 passes over these teeth and over a sprocket wheel fixed to the drill shaft 21, so that the latter and the seed-plate are rotated when the clutch member 31 is connected to the clutch member 30. Preferably, a series of sprocket wheels of different sizes are mounted on the drill shaft and the chain is arranged to be engaged with any one of them. In the form shown there are three of these sprocket wheels 44, 45 and 46. The upper part of the chain, as most clearly shown in Fig. 7, extends forwardly from the clutch member 31 under a guide roller 47 and over a tightening roller 48. The guide roller 47 is fixed to a bracket 49 that is secured to a cross bar 50 extending between the side bars 13 of the main frame. The tightening roller 48 is fixed to the forward, free end of an arm 51, the rear end of which is journaled in lugs on the bracket 49. A spring 52 is coiled about the pivot of the arm 51 and the ends of the spring engage the bracket and the arm and press the arm and roller 48 upwardly to tighten the chain 43. The chain is so long that, when the arm 51 and tightener roll 48 are depressed against the tension of the spring 52, sufficient slack will be obtained in the chain to permit it to be readily shifted from any one of the sprocket wheels on the drill shaft to any other of such wheels. The roller 48 on the spring-held arm 51, will hold the chain under proper tension when it is in engagement with any one of the sprocket wheels on the drill shaft. The roller is free to slide laterally upon the end of the arm 51 and is provided with flanges for engaging the sides of the chain so that it will be brought properly into line with any one of the sprocket wheels. The sleeve 35 is also provided with a small sprocket wheel 53 and, when the machine is used for drilling, the chain may be passed over this sprocket wheel and over any sprocket wheel on the drill shaft.

The "tight" clutch member 30 is provided with a laterally projecting flange 54 having a series of ratchet teeth 55 upon its inner face (see Fig. 4). These ratchet teeth are arranged to be engaged by a dog 56 that is eccentrically pivoted on the face of the clutch member 31 by a bolt 57. The clutch dog is normally held out of engagement with the ratchet teeth 55 by a link 58 that is connected at one end to the dog and at its opposite end to a stud 59 that projects through a segmental slot 60 in the face of the clutch disk 31. This stud is fixed to a rotatable clutch controlling member, the hub 61 of which (see Fig. 5) is loosely mounted upon the long sleeve-like hub 33 of the clutch disk 31. This clutch controlling member has a number of sets of stop arms, as shown in Figs. 1, 5, 9, 10 and 11. These arms are arranged in different sets and in different lateral planes, there being six arms 62, four arms 63 and three arms 64, all mounted upon the common hub 61. The arms of each set are uniformly spaced apart and some of the arms 63 of the middle set are in line with other of the arms 62 and 64 of the inner and outer sets and are formed in piece therewith. The arms extend outwardly through openings 65 in a cylindrical flange or drum that is fixed to the "loose" clutch member 31. For convenience in assembling the parts, this cylindrical flange or drum is formed in three sections, 66, 67 and 68. The circular section 66 is formed in one piece with the clutch disk 31 and the semi-circular sections 67 and 68 are connected together at 69 and are connected to the clutch disk 31 by bolts 70 that extend through inwardly projecting lugs 71 and 72 on the connected parts.

A spring 73 extends between one of the arms 64 and a hook 74 on the flanged section 68. This spring tends to rotate the clutch controlling member on the hub 32 of the clutch disk 31 and thereby move the clutch dog 56 into engagement with the ratchet teeth 55 on the "tight" clutch member 30 and so rotate the clutch member 31 and the seed-plate 19 through the medium of the chain 43 and drill shaft 21. The parts are normally held in the position shown in the drawings with the spring 73 under tension and the clutch dog 56 out of engagement with the ratchet teeth 55, by a detent 75 having a hook-shaped, pointed nose that normally extends within one of the openings 65 on the cylindrical flange of the loose clutch member and between one edge of the opening and the stop arm of the clutch controlling member therein. This detent is shifted by the check row devices into the position shown in Fig. 8, so that the spring 73 rocks the clutch controlling member and moves the clutch dog 56 into engagement with the ratchet teeth. All parts of the clutch, including the "loose" member and the clutch controlling member, then rotate in the direction indicated by the arrows until the detent engages the next arm in line therewith, when its pointed nose enters between the next arm and the edge of the opening wherein the arm is located, and thereby arrests the clutch controlling member so that the forward movement of the clutch member 31 moves the clutch dog 56 out of engagement with the ratchet and thereby arrests the movement of the seedplate operating mechanism. The detent 75 may be shifted into line with any one of the sets of arms on the clutch controlling member so that the loose clutch member can be rotated through one-sixth, one-fourth or one-third of a revolution at each operation. The detent 75 is provided intermediate its ends with a hub portion which is arranged between a pair of lugs 77 on a bracket 78 and the detent and bracket are slidably mounted upon a horizontal pin or bolt 79 (see Figs. 1 and 4) that is fixed at its outer end to a bracket 80 depending from the adjacent side bar 13. The pin or bolt 79 whereon the detent 75 and bracket 78 are slidably mounted extend, as shown, through the lugs 77 on the bracket and through the hub of the detent and serves as a pivot whereon the detent oscillates into and out of engagement with the arms of the clutch controlling member.

An arm 81 on the hub of the detent, is connected by a curved link 82 to one end of a spring 83, the other end of which is connected to the forward end of the bracket 78 by an adjusting screw 84. A link or connecting rod 85 is connected at its rear end to the tail or lower end of the detent 75. The forward end of this rod engages a segmental slot 86 in the upper end of an arm 87 that is fixed to the check row shaft 26.

When a knot on the check row wire engages one of the forks on the rock shaft 26, the latter is rocked and through the medium of the arm 87 and the rod 85, shifts the detent 75 and lifts its nose 76 out of the opening 65 in which it is located. The clutch spring 73 then quickly shifts the clutch controlling member and throws the clutch dog 56 into engagement with the ratchet teeth 55, so that all parts of the clutch mechanism are rotated in the direction indicated by the arrows in the drawings. The check row rock shaft is returned to normal position by its spring 28, but the nose 76 on the detent 75 cannot at once reëngage one of the openings 65 on the cylindrical flange of the clutch member 31 and the detent is held in the shifted position shown in Fig. 8, either by one of the rearwardly extending portions 88 upon the ends of the arms of the clutch controlling member or by the surface of the cylindrical flange or drum. The lost motion or slotted connection between the arm 87 on the rock shaft and the connecting rod 85, permit the independent return of the check row rock shaft to normal position, while the detent 75 and parts connected thereto are still held in the shifted position as shown in Fig. 8. The spring 83 connected to the detent 75, forces its nose 76 against the cylindrical flange on the clutch member 31 and, when the nose 76 engages the next arm in line therewith, the spring forces the nose into the opening, arrests and forces back the clutch controlling member so that the clutch dog 56 is disengaged from the ratchet teeth 55, and arrests the movement of the loose clutch member 31 and of the seed-plate operating mechanism driven thereby. The arrangement is such that the spring 83 and the forward rotation of the clutch coöperate to force the nose 76 of the detent into the positions shown in Figs. 4, 6 and 7, so that there is no chattering of the clutch dog 56 over the ratchet teeth 55 when the clutch is thrown out of operation.

It should be noted that the detent 75, which engages the sets of stop arms 62, 63 and 64 of the clutch controlling member, serves to automatically disengage the clutch members and arrest the movement of the loose clutch member, the detent also serving, when in engagement with one of the stop arms, to hold the loose clutch member in idle position with the clutch dog 56 in its disengaged position.

By mounting the clutch on the wheel axle, its speed of movement is much less than if it were arranged upon the drill shaft 21 as in prior constructions. Moreover, the parts of the clutch and its bearings are larger and the drive chain and both sets of sprocket wheels over which it passes, remain stationary through a large part of the forward movement of the planter between rows, so that there is less wear upon the moving parts and the clutch mechanism itself is less liable to get out of order.

The bracket 78 and the detent 75 are slidably mounted as stated, upon the pivot pin or bolt 79. The bracket 78 is held in horizontal position by a hook-shaped nose 89 thereon that extends over the cross bar 50 of the main frame. The bracket itself extends beneath and closely adjacent the lower edge of this bar. The bracket 78 and detent 75 are shifted laterally along the pivot bolt 79 and bar 50 to bring the detent into line with any one of the sets of arms on the clutch controlling member, by a vertically arranged hand lever 90 that is connected to the bracket by a link 91. The link 91 is connected to the lever 90 at its lower end (see Figs. 2 and 3) and the lever, adjacent its lower end, is pivoted upon a stud 92 on a segmental shaped bracket 93 that is fixed to the seat post 94 that rises from the cross bar 50 of the main frame (see Fig. 1). A bolt 95 extends through the stud 92, and a spring 96 coiled about the bolt engages the lever 90 and holds it in position with a stud 97 thereon in engagement with one of a series of three holes 98 in the upper edge of the segmental bracket 93. The lower edge of the bracket is provided with an outturned segmental flange 99 that engages the lower end of the lever. In operating the lever, its upper end is first swung forwardly, so that it rocks on the flange 99 against the tension of the spring 96, and the stud 97 thereon is shifted out of engagement with one of the holes 98. The lever may then be oscillated on its pivot to shift the bracket 78 and detent 75 laterally and thereby bring the latter into line with any one of the sets of arms 62, 63 or 64 on the clutch controlling member. These parts are locked in adjusted position by the reëngagement of the stud 97 on the lever 90 with one of the openings 98 in the segmental bracket 93.

By the arrangement set forth, it is obvious that the clutch mechanism can be rotated through different parts of a revolution at each operation. It will be understood that the arrangement of the arms on the clutch controlling member can be varied, but, with the particular construction set forth, the clutch can be rotated through one-sixth, one-fourth or one-third of a revolution at each operation. In the particular arrangement of gearing shown, the chain 43 will extend across the sprocket teeth 42 on the loose clutch member 31 and over the sprocket wheel 44 on the drill shaft 21 when the machine is used for check row planting. The clutch member 31 has twelve sprocket teeth and the wheel 44 has six, so that the drill shaft is rotated at twice the speed of the wheel axle, but the beveled gear 23 has only half as many teeth as the beveled gear 24 that is connected to the seed-plate, so that the seed-plate rotates with the same speed as the wheel axle. In the form shown, the seed-plate is provided with twelve cells, each of which is arranged to receive a single grain of corn, so that, in the different adjustments of the clutch mechanism, the seed-plate will be rotated through one-sixth, one-fourth or one-third of a revolution and two, three or four cells will pass over the discharge opening, two when the detent 75 is in line with the arms 62, three when the detent is in line with the arms 63, and four when it is in line with the arms 64 and two, three or four kernels will be planted in each hill. This change can be readily made without stopping the machine. The segment 93 whereon the adjusting lever 90 is mounted, is provided at its upper edge with a numbered flange 100 to aid the operator in adjusting the clutch to plant the desired number of seed in each hill. The sprocket wheels 45 and 46 are provided with seven and nine teeth respectively and are usually employed for drill planting but can be used for check row planting. With the chain running over the sprocket wheel 45 and the detent 75 in line with the arms 63 of the clutch controlling member, the planter will alternately deposit two and three kernels in the hills and with the detent in line with the arms 64, three and four kernels will be alternately deposited in the hills.

It is not only necessary that the gearing between the clutch and the seed plate shall be such that the plate is rotated through different predetermined arcs to pass two, three or four cells over the discharge opening of the hoppers, but it is also necessary that the gearing be such that the seed cells of the plates will properly register with the discharge opening. In other words, it is necessary that the clutch be connected to the seed plates by what is known in this art as "time gearing". Where the intermittently operating, automatically disengaging clutch is mounted on the drill shaft, it is only essential that the gears between the drill shaft and seed plate be so arranged that the cells of the seed plates will properly register with the discharge openings. If this is not done, the planter would frequently deposit two kernels in a hill when set to plant three and the next hill would receive four kernels. With the clutch on the wheel axle it is necessary in addition to connect the clutch to the drill shaft by time gearing and this time gearing must effect the proper register of the cells of the plates with the discharge openings of the hoppers when the machine is set to plant either two, three or four kernels. This is particularly necessary, since the connecting gearing between the clutch and the drill shaft is changed from time to time and must be so arranged that when shifted and replaced the gearing will still hold the seed plate in proper position. In the preferred form shown, the clutch member, as stated, is geared to rotate at the same speed as the seed plate when the chain 43 runs over the sprocket 44 on the drill shaft. The loose clutch member has the same number of sprocket teeth as the seed plates and cells. The links of the chain are of course of a length corresponding to the length of the teeth on the clutch sprocket, and the movement of the sprockets and drive chain 43 through the distance of one tooth or link serves to advance the seed plates through arcs equal to the distances between the centers of two adjacent cells. By this arrangement, the seed plates are always maintained in proper timed relation to the intermittently acting clutch and the cells thereof will properly register with the discharge openings. Moreover, the chain can be shifted or the number of links thereof can be changed without affecting the proper relation of the seed plates to the clutch and to the discharge openings of the seed hoppers. With the drive chain running from the loose clutch member to the sprocket 45 on the drill shaft, the gearing is so timed that the seed plate will run somewhat slower and two and three kernels or three and four kernels can then be planted in alternate hills, as described. Under such circumstances, not more than three or less than two kernels can be planted in a hill if the machine is set to plant alternately two and three kernels and no more than four or less than three can be deposited, if it is set to plant three or four kernels alternately. But where a planter is set for the same number of kernels in each hill, the seed plate must be maintained as stated in proper timed relation to the discharge opening to insure the passage of the proper number of cells over the discharge opening at each operation and the proper registry of the cells with the discharge opening, since otherwise less than the desired number might be planted in one hill and more than this number in the next.

For drill planting, the clutch mechanism will be thrown out of operation and the chain arranged at its rear end either on the sprocket teeth 42 or on the sprocket teeth 53 and with its forward end on any one of the sprocket wheels 44, 45 or 46. With the particular arrangement shown, these six changes will plant the seed at eight, nine and one-half, twelve, fourteen, sixteen or nineteen inches apart. The clutch is thrown out of operation for drill planting by a foot pedal 101 pivotally mounted on the bracket 102 on the cross-bar 50 and connected to an arm 103 on the check row rock shaft by a link 104. This shifter for the rock shaft may be used for planting hills, but is also arranged to permanently lock the shaft in shifted position to hold the detent out of engagement with the clutch mechanism, so that the clutch dog 56 of the loose clutch member 31 remains in engagement with the ratchet teeth 55 of the tight clutch member 30.

The set of sprockets 44, 45 and 46 which are used to vary the operation of the planter in drilling are usually mounted upon the wheel axle, but, with the applicant's improved arrangement of the intermittently acting clutch on the wheel axle, these sprockets are carried upon the drill shaft between the clutch and the seed plates and can be employed in connection with the clutch, as described, for alternately planting two and three kernels or three and four kernels in the hills. This manner of planting is highly desirable with certain soils, for example, some soils might contain more nourishment than would be required by two stalks in each hill, but not enough nourishment for three stalks in each hill. With the present planter, the planting of two and three kernels in alternate hills in such a soil could be readily effected, whereas it would otherwise be necessary to provide an additional set of plates. Moreover the sprockets on the drill shaft can be used in connection with the sprocket 53 on the wheel axle for planting in hills in case the clutch gets out of order. In this case, the seed plates would rotate continuously and the seed accumulated in the boots would be planted at the hills when the valves are tripped by the check-row devices.

When the clutch is in operation in check row planting, the nose 76 on the dog 75, as stated, normally engages one of the arms on the clutch controlling member to hold the clutch dog 56 out of operation and the clutch spring 73 under tension. As soon as the detent is shifted by the check row rock shaft, the spring 73 shifts the clutch controlling member and the arms thereon into such position that the backwardly projecting end portions 88 on the arms partially close the openings 65 in the cylindrical drum or flange and the nose of the detent can not reëngage the same arm but will engage the end of the next adjacent arm to arrest the clutch controlling member. The detent spring 83 will then force the nose 76 into the opening to throw out the clutch dog and check the rotation of the moving parts.

It will be understood that the number of holes in the seed-plate 19 and the number of teeth upon the sprocket wheels can be varied without departure from the essentials of the invention but they should bear a definite relation to one another to effect accurate planting. It is also obvious that numerous changes can be made in the details set forth without departure from the essentials of the invention as defined in the claims.

It should also be noted that the form of the intermittently operating clutch may be widely varied without departure from the present invention, although, for full disclosure of the preferred embodiment of the invention, the particular clutch construction employed is described in detail.

I claim as my invention:—

1. In a corn planter, the combination with the frame, supporting wheels and wheel axle, of seed hoppers on the frame, seed plates in said hoppers, a transverse drill shaft geared to said seed plates, an automatic, start-and-stop action clutch mounted on said wheel axle, check-row devices for throwing said clutch into operation, and gearing connecting said clutch and said drill shaft, said clutch being arranged to operate said connecting gearing and drill shaft during a portion of the forward travel of the machine between cross-rows, substantially as described.

2. In a corn planter, the combination with the main frame, supporting wheels and wheel axle, of seed hoppers on said frame, seed plates in said hoppers, a transverse drill shaft geared to said seed plates, an intermittently operating, automatically disengaging clutch comprising tight and loose clutch members mounted on said wheel axle, check-row devices, connections between said check-row devices and said clutch for controlling the engagement of said clutch members, and gearing interposed between the loose clutch member on the wheel axle and said drill shaft arranged to effect the proper registry of the cells of said seed plates with the discharge openings of said seed hoppers, substantially as described.

3. In a corn planter, the combination with the main frame, supporting wheels therefor and a wheel axle journaled on said main frame, of a front frame hinged to said main frame, seed hoppers on said front frame, seed plates therein, a transverse drill shaft journaled on said front frame and geared to said seed plates, an intermittently operating start-and-stop action clutch comprising tight and loose clutch members mounted on said wheel axle, connecting gearing between said loose clutch member and said drill shaft, check-row devices mounted on said front frame and connections between said check-row devices and said clutch for intermittently throwing said clutch and said connecting gearing into operation, said clutch being arranged to operate said connecting gearing and said drill shaft during a part of a revolution of said wheel axle, substantially as described.

4. In a corn planter, the combination with the main frame, supporting wheels therefor and a wheel axle journaled on said main frame, of a front frame hinged to said main frame, seed hoppers on said front frame, seed plates therein, a transverse drill shaft journaled on said front frame and geared to said seed plates, an intermittently operating start-and-stop action clutch comprising tight and loose clutch members mounted on said wheel axle, a check-row rock shaft journaled on said front frame, connections between said rock shaft and said clutch for controlling the engagement of said clutch members, and gearing interposed between the loose clutch member on the wheel axle and said drill shaft arranged to effect the proper registry of the cells of said seed plates with the discharge openings of said seed hoppers, substantially as described.

5. In a corn planter, the combination with the main frame, supporting wheels therefor and a wheel axle journaled on said main frame, of a front frame hinged to said main frame, seed hoppers on said front frame, rotating seed plates in said hoppers, a transverse drill shaft journaled on said front frame and geared to said seed plates, a check-row rock shaft journaled on said front frame, an intermittently operating clutch comprising tight and loose clutch members on said wheel axle, a clutch dog movably mounted on said loose clutch member and spring pressed into engagement with said tight clutch member, a tripping detent mounted on the main frame adjacent said clutch and normally holding said clutch dog in disengaged position, an arm on said check-row rock shaft, a link connecting said arm and said tripping detent, and drive gearing interposed between the loose clutch member on the wheel axle and said drill shaft arranged to effect the proper registry of the cells of said seed plates with the discharge openings of said seed hoppers, substantially as described.

6. In a corn planter, the combination with the main frame, supporting wheels therefor and a wheel axle journaled on said main frame, a front frame hinged to said main frame, seed hoppers on said front frame, seed plates therein, a transverse drill shaft journaled on said front frame and geared to said seed plates, an intermittently operating, automatically disengaging clutch comprising tight and loose clutch members on said wheel axle, connections between said check-row rock shaft and said clutch for effecting the engagement of said clutch members, sprocket teeth on said loose clutch member, a series of sprocket wheels of different sizes on said drill shaft, a chain arranged to pass over said sprocket teeth and any one of said sprocket wheels, and a spring-held tightener engaging said chain, substantially as described.

7. In a corn planter, the combination with a wheel axle, seed hoppers and rotary seed plates therein, each of said plates having a circular series of uniformly spaced cells, of a transverse drill shaft geared to said seed plates, an intermittently operating, automatically disengaging clutch comprising tight and loose clutch members mounted on said wheel axle, chain and sprocket gearing connecting said loose clutch member to said drill shaft, and check-row devices for effecting the engagement of said clutch members and thereby intermittently operate said connecting gearing, drill shaft and seed plates, said sprocket gearing being arranged to advance the seed plates through a distance equal to that between the cells thereof as said chain advances through a distance equal to one link, substantially as described.

8. In a corn planter, the combination with a wheel axle, and seed plate, of an intermittently operating, automatically disengaging clutch driven from said wheel axle, means for varying the throw of said clutch, variable connecting gearing between said clutch and said seed plate and check-row devices controlling the intermittent operation of said clutch, substantially as described.

9. In a corn planter, the combination with a wheel axle, seed hoppers and rotary seed plates therein, of a transverse drill shaft geared to said seed plates, an intermittently operating, automatically disengaging clutch comprising tight and loose clutch members mounted on said wheel axle, said loose clutch member having a series of sprocket teeth, a series of sprocket wheels of different sizes mounted on said drill shaft, a chain arranged to pass over said sprocket teeth and any one of said sprocket wheels, check-row mechanism controlling the intermittent operation of said clutch, and means for varying the predetermined throw of said clutch, substantially as described.

10. In a corn planter, the combination with the supporting wheels, wheel axle, seed hoppers and rotary seed plates therein, of a transverse drill shaft geared to said seed plates, an intermittently acting, automatically disengaging clutch comprising tight and loose clutch members and a clutch controlling member mounted on said wheel axle, a detent coöperating with said controlling member for effecting partial revolutions of said loose clutch member, check-row devices connected to said detent and controlling the engagement of said clutch members, means coöperating with said detent and said controlling member for varying the throw of said automatically disengaging clutch, and connecting gearing between said loose clutch member, on said drill shaft and operated by said clutch during portions of the forward travel of the machine between cross rows, substantially as described.

11. In a corn planter, the combination with the supporting wheels, wheel axle, seed hoppers and rotary seed plates therein, of a transverse drill shaft geared to said seed plates, an intermittently acting, automatically disengaging clutch comprising tight and loose clutch members mounted on said wheel axle, check-row devices connected to said clutch and controlling the engagement of said clutch members, means for varying the throw of said automatically disengaging clutch and gearing interposed between the loose clutch member and the wheel axle and said drill shaft arranged to effect the proper registry of the cells of said seed plates with the discharge openings of said seed hoppers, substantially as described.

12. In a corn planter, the combination with the main frame, the supporting wheels, a wheel axle journaled on said main frame, of a front frame hinged to said main frame, seed hoppers on said front frame, rotary seed plates in said hoppers, a transverse drill shaft journaled on said front frame and geared to said seed plates, an intermittently operating, automatically disengaging clutch comprising tight and loose clutch members mounted on said wheel axle, check-row devices mounted on said front frame and connected to said clutch for controlling the intermittent engagement of said clutch members, means for varying the predetermined throw of said automatically disengaging clutch, and gearing interposed between the loose clutch member on the wheel axle and said drill shaft arranged to effect the proper registry of the cells of said seed plates with the discharge openings of said seed hoppers, substantially as described.

13. In a corn planter, the combination with the main frame, the supporting wheels, a wheel axle journaled on said main frame, of a front frame hinged to said main frame, seed hoppers on said front frame, rotary seed plates in said hoppers, a transverse drill shaft journaled on said front frame and geared to said seed plates, an intermittently operating, automatically disengaging clutch comprising tight and loose clutch members mounted on said wheel axle, chain and sprocket gearing connecting said loose clutch member to said drill shaft, check-row devices mounted on said front frame and connected to said clutch for controlling the intermittent engagement of said clutch members, and means for varying the predetermined throw of said clutch, the length of the teeth and links of said chain and sprocket mechanism being sufficient to advance said seed plates through a distance equal to that between the cells thereof as the chain advances through a distance equal to one link, substantially as described.

14. In a corn planter, the combination with the main frame, the supporting wheels, a wheel axle journaled on said main frame, of a front frame hinged to said main frame, seed hoppers on said front frame, rotary seed plates in said hoppers, a transverse drill shaft journaled on said front frame and geared to said seed plates, an intermittently operating, automatically disengaging clutch comprising tight and loose clutch members mounted on said wheel axle, check-row devices mounted on said front frame and connected to said clutch for controlling the intermittent engagement of said clutch members, sprocket teeth on said loose clutch member, a series of sprocket wheels of different sizes on said drill shaft, and a chain arranged to pass over said teeth and any one of said sprocket wheels, substantially as described.

15. In a corn planter, the combination with a wheel axle, seed hoppers and rotary seed plates therein, and a transverse drill shaft geared to said seed plates, of a start-and-stop action, automatically disengaging clutch comprising tight and loose members mounted on said wheel axle and arranged to be engaged during partial revolutions of said wheel axle, check-row devices controlling the intermittent engagement of said clutch members, means for varying the throw of said loose clutch member and variable gearing connecting said loose clutch member to said drill shaft, substantially as described.

16. In a corn planter, the combination with the main frame, supporting wheels and wheel axle, of seed hoppers on said frame, rotary seed plates therein, a transverse drill shaft geared to said seed plates, a start-and-stop-action clutch comprising tight and loose clutch members mounted on said wheel axle and arranged to be engaged during partial revolutions of said axle, check-row devices controlling the intermittent engagement of said clutch members, a set of sprocket wheels of different sizes on said drill shaft, a tight sprocket wheel on said wheel axle, and a chain for connecting said tight sprocket wheel or said loose clutch member with any one of the sprocket wheels on said drill shaft, substantially as described.

CLEMENT W. MICHAEL.

Witnesses:
CHARLES A. ARMSTRONG,
RICHARD C. ANDERSON.

Copies of this patent may be obtained for five cents each, by addressing the "Commissioner of Patents, Washington, D. C."